United States Patent [19]

Berger et al.

[11] Patent Number: 4,781,156
[45] Date of Patent: Nov. 1, 1988

[54] ENGINE VIBRATION BALANCER

[75] Inventors: Alvin H. Berger, Brownstown; Roy E. Diehl, Northville; Gordon W. Ellis, Westland, all of Mich.

[73] Assignee: Ford Motor Company, Dearborn, Mich.

[21] Appl. No.: 130,780

[22] Filed: Dec. 9, 1987

[51] Int. Cl.[4] .......................... F02F 7/00; F02B 75/06
[52] U.S. Cl. ............................ 123/192 R; 123/198 E; 123/192 B; 74/604
[58] Field of Search ........... 123/192 R, 192 B, 198 E; 74/604

[56] References Cited

U.S. PATENT DOCUMENTS

| 1,640,634 | 8/1927 | Wise | 123/192 R |
| 2,235,160 | 3/1941 | Ljangstrom | 123/192 B |
| 3,468,190 | 9/1969 | Sampiatro | 123/192 B |
| 4,520,770 | 6/1985 | Ogawa | 123/198 E |

FOREIGN PATENT DOCUMENTS 2333038  1/1975  Fed. Rep. of Germany ... 123/192 B

OTHER PUBLICATIONS

Research Inclosure, May 1982, No. 21731, "Reciprocating Balancer (F06)" disclosed anonomously.–May 1982.

Primary Examiner—Raymond A. Nelli
Attorney, Agent, or Firm—Robert E. McCollum; Clifford L. Sadler

[57] ABSTRACT

An automotive engine crankshaft has a vibration balancing mass suspended from a main bearing cap on rods or bolts for an oscillatory radial movement in response to reciprocation of the mass by contoured cam wheels on the cheeks of the crankshaft, the cam wheels engaging rollers or cam follower wheels on a shaft freely rotatable in the balancing mass, the mass being restricted to a translational movement in a radial direction only, the mounting of the mass including a pivot/bushing that restricts the movement to the one translational direction only while at the same time permitting a slight rotational or pivotal movement of the mass about three axes to correct for any slight misalignment of the axis of the mass with respect to the axis of the crankshaft.

17 Claims, 2 Drawing Sheets

ENGINE VIBRATION BALANCER

This invention relates in general to a motor vehicle type engine, and more particularly, to a means for balancing engine vibrations.

It is a primary object of the invention to provide a device that will balance second order engine vibrations; i.e., those vibrations that are caused by second order vertical shake as the pistons move radially, by means of a crankshaft-driven vibration balancing mass that is oscillated or reciprocated by contoured cams attached to the crankshaft and engaging wheels or rollers secured to a rotatable shaft carried by the balancing mass.

The invention, therefore, is directed to a force driven balancing mass, in contrast to a vibration driven balancing device that causes the engine to be less responsive to vibrations rather than cancelling or balancing them out in the manner of this invention.

Crankshaft-driven vibration balancing devices are known. For example, U.S. Pat. No. 3,468,190, Sampietro, shows a vibration balancing mass consisting of a piston secured to a shaft having wheels or rollers at its opposite ends engageable with contoured cams on the cheeks of the crankshaft. Reciprocation of the piston balances secondary shake forces as well as other vibrations.

U.S. Pat. No. 2,235,160, Ljungstrom shows a vibration balancing mass 44 slidable vertically or radially with respect to the crankshaft on a pair of guide Pins 45 to balance objectionable engine vibrations. However, the mass is attached to the crankshaft by an eccentric lever 43, which may induce frictional forces during the sliding movement of the mass because of the non-radial application of force to the mass. The balancing mass of the invention operates with a minimum of friction Research disclosure of May, 1982, No. 21731, "Reciprocating Balancer (F06)", shows an engine block having a reciprocating frame mounted on rollers on which are mounted elliptical gears engageable with a gear on the crankshaft to cause oscillation of the frame to balance undesirable engine vibrations.

Offenlegungsschrift No. 23 33 038, Thauer et al, shows a dual cam arrangement secured to the crankshaft for actuating a balancing mass that is arcuately pivotally secured to a part of the frame and movable to balance undesirable engine vibrations. Spring means are included to bias the mass against the cam.

U.S. Pat. No. 1,640,634, Wise, shows a cam mounted on the crankshaft with two cam lobes for actuating a lever 36 that is attached to a reciprocating Plunger for balancing engine vibrations.

It is a primary object of the invention to provide a vibration balancing mass that will not only cancel out undesirable engine vibrations, but will do so with a minimum of friction; this being accomplished by providing the device with several degrees of freedom of movement rotationally, while restricting translational movement, to provide for correct alignment of the mass so as to induce no motion other than one essentially in a pure radial direction.

The above prior art does not teach or describe such a construction. None of the above prior art shows or describes any means for reducing friction during reciprocation of the vibration balancing mass, by providing several freedoms of movement of the mass while restricting its reciprocation to essentially a pure radial or vertical movement. The invention accomplishes this by providing a spherical bushing type mount that allows slight rotational movement of the balancing mass about its various axes to compensate for any slight misalignment of the axes so that side and other forces are not developed during its movement.

Other objects, features and advantages of the invention will become more readily apparent upon reference to the succeeding, detailed description thereof, and to the drawings illustrating the preferred embodiments thereof; wherein, FIG. 1 is a side elevational view, with parts broken away and in section, of a portion of an engine crankshaft;

Figure 1:
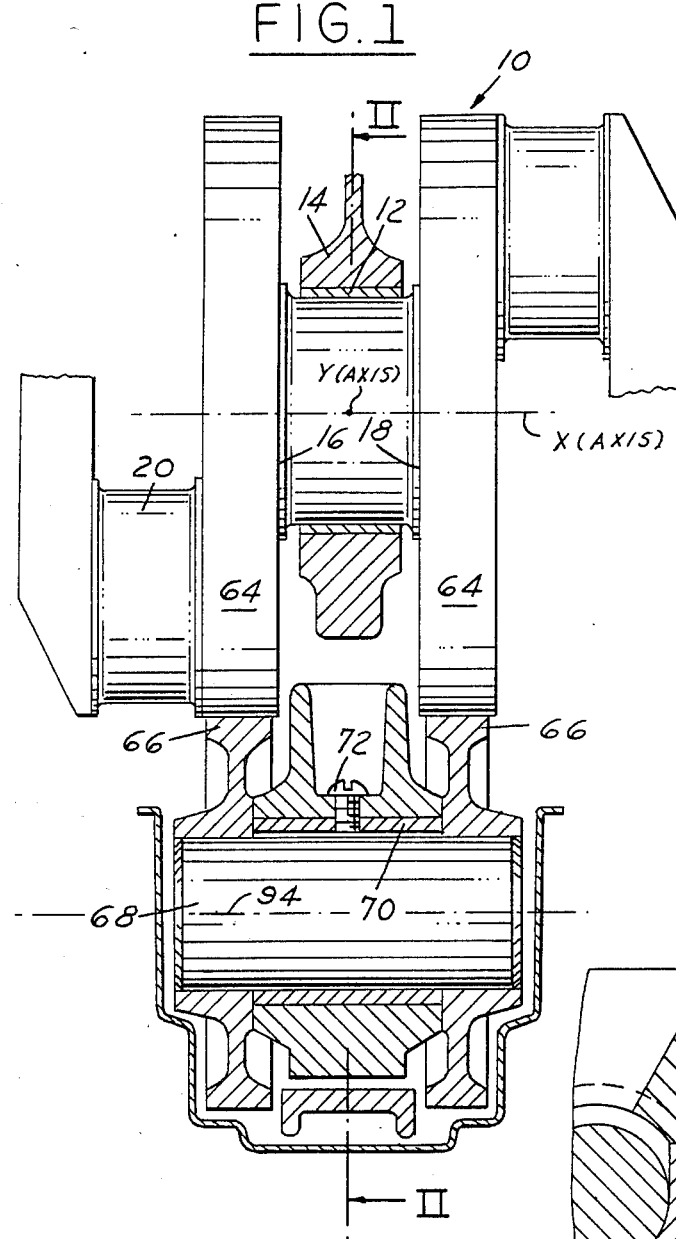
Figure 2:
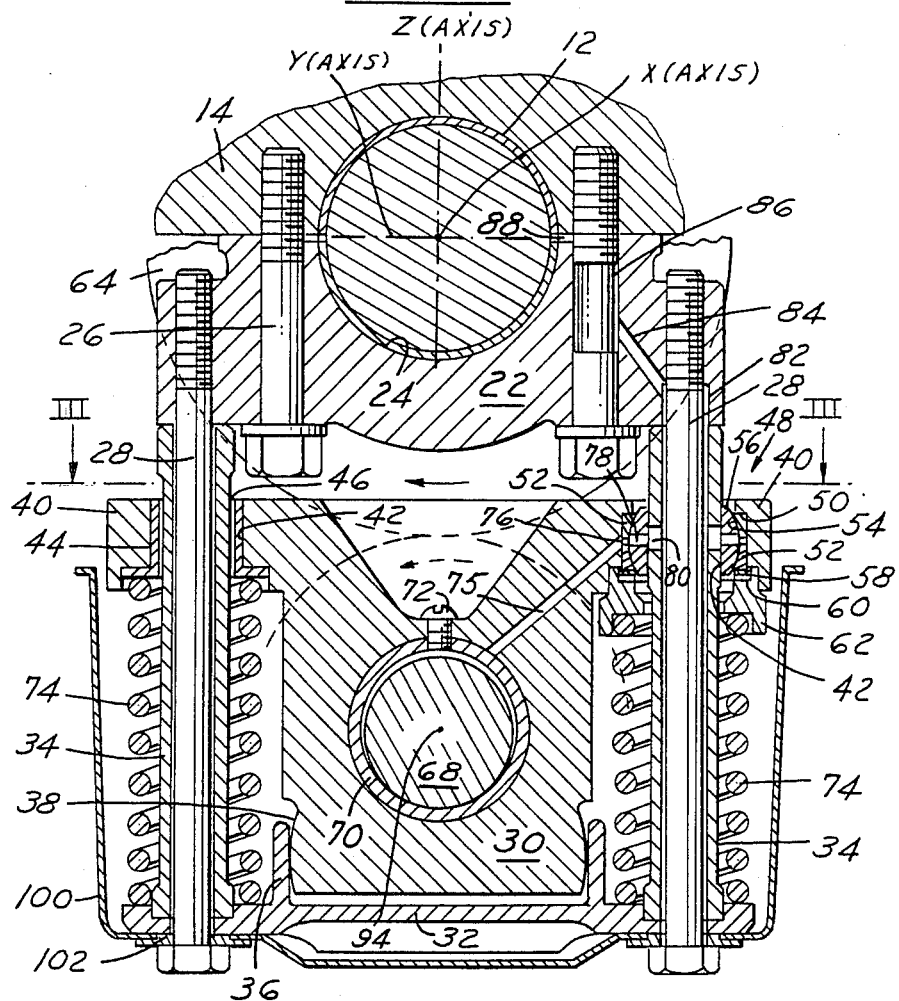
FIG. 2 is a cross-sectional view taken on a Plane indicated by and viewed in the direction of the arrows II—II of FIG. 1.

FIGS. 1 and 2 show a portion 10 of an automotive type engine crankshaft. The crankshaft is supported in the engine block (not shown) by a number (only one shown) of journal type main bearings 12 supported in the block on upper bearing caps 14 formed as a part of the block.

The crankshaft is formed with the usual cheeks 16 and 18 on opposite sides of the main bearing, and the usual connecting rod pins 20, to which the ends of the connecting rods would be fastened in the usual manner. As best seen in FIG. 2, the journal bearings 12 and crankshaft are secured in the engine block and upper bearing cap 14 by a lower bearing cap 22 having a semicylindrical recess 24 for receiving the same. The lower main bearing cap is secured to the block in the usual manner by a pair of attaching bolts 26.

Attached to lower bearing cap 22 and projecting downwardly from it on either side are a pair of supporting bolts or rods 28 that slidably support thereon an engine vibration balancing mass 30. The lower ends 32 of the bolts are connected and spaced laterally by lower guide plate 32. The guide plate is located vertically by a spacer sleeve 34 surrounding each bolt 28. The spacer plate 32 is formed with a pair of upstanding flat flanges 36 that receive between them the spherically shaped end surface 38 of the vibration balancing mass 30.

Figure 3:
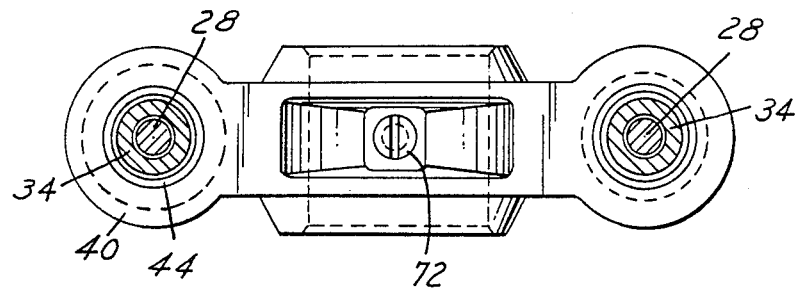
FIG. 3 is a cross-sectional view taken on a plane indicated by and viewed in the direction of the arrows III—III of FIG. 2.

The mass 30 has essentially a rectangular flat shape as seen best in FIGS. 1 and 3, and its upper end is formed with a pair of laterally extending projections or wing-like portions 40. The latter each are formed with a hole 42 for slidably receiving through it the sleeve 34 so that the mass 30 can be reciprocated vertically. The left hand (as seen in FIG. 2), hole 42, also has a sleeve insert 44 of an inner diameter providing a slight annular clearance space 46 between sleeve 34 and the insert, for a purpose to be described later. At the opposite or right hand (as seen in FIG. 2) side of mass 30, the hole 42 receives a spherical pivot/bushing 48 that surrounds an enlarged portion of sleeve 34 without any clearance space between it and the bushing other than enough to permit it to slide vertically on sleeve 34.

More specifically, the right hand wing-like portion 40 of mass 30 has an annular recess 50 in which is press fitted a sleeve 52 that is split into two pieces for ease of assembly. The inner surface of sleeve 52 is spherically formed for cooperation with a mating spherical surface 54 of a ring member 56 slidably mounted on the sleeve 34. The sleeve 52 and ring 56 in this case are first assembled in portion 42 and upon the sleeve 34 by installation from beneath. An annular wavy spring 58, assembled into a recess 60 of an annular keeper 62, maintains the bushing assembled in place as shown.

It will be clear from an inspection of the drawings and from the above description that the mass 30 can pivot or rotate about the spherical bushing 48 for selfalignment purposes, as will be described in more detail later. This rotational action is permitted by the clearance space 44 on the left-hand projecting wing portion 40.

The vibration balancing mass 30 is adapted to be reciprocated or oscillated vertically or radially along the vertical or Z axis of the crankshaft indicated. This is accomplished by means of a pair of essentially identical cam wheels 64 ground or contoured on the cheeks 16 and 18 (FIG. 1) of the crankshaft. Each of the cam wheels engages a cam follower wheel or roller 66 (FIG. 1) that is fixed on an end of a rotatable shaft 68. The latter is rotatably mounted in the vibration balancing mass 30 within a journal bearing 70 held stationary to the balancing mass 30 by a suitable set screw 72. The contour of the cam wheels 64 will, within tolerances, be identical and chosen to provide balancing of a particular order of vibration of the engine crankshaft to oscillate the mass 30 in the desired manner to oppose these vibrations. A pair of springs 74, located between the lower guide plate 32 and sleeve 44 on the one side and the keeper 62 on the other side, bias the mass 30 upwardly so that the wheels 66 at each end are maintained in engagement with the contoured cam wheels 64 at all times.

As stated previously, a primary purpose of the invention is to eliminate objectional engine vibrations by providing a balancing mass that reciprocates vertically or radially with respect to the crankshaft axis, and in that direction while keeping frictional forces to a minimum. In order to accomplish this, some means must be provided to compensate for misalignment of the oscillating mass that otherwise would cause binding and thereby increase friction. This is accomplished by the spherical bushing 48 located at the upper right-hand wing portion 40 of the balancing mass, and also the spherical surface 38 at the lower or radially outermost portion of the mass, and the slight annular clearance 46 between the sleeve 34 and the sleeve insert 44 on the left hand wing portion 40 of the mass.

More specifically, translation in a vertical or radial direction along the Z axis is desired for the oscillating vibration balancing feature. Translation in other directions along the X and Y axes is not desired. To provide for this essentially purely radial or vertical movement with minimum friction, the mass 30 must be free to move slightly rotationally about the crankshaft axes. More specifically, the pivot bushing 48, having no clearance between the mass 30 and sleeve 34, together with the spherical end 38 of the mass 30, prevents translational movement of mass 30 along the Y axis, as shown in FIG. 2. The pivot bushing 48 also prevents translation along the X axis in FIG. 1. The pivot/bushing combination, together with the flat flanges 36 and sperical end 38, do permit, however, rotation about the Y and Z axes to provide proper alignment of the cam follower wheels 66 with the crankshaft to provide essentially a purely radial or vertical movement of the mass with friction reduced to an absolute minimum.

Rotational position about the X axis, as seen in FIG. 2, is accommodated by the small clearance space 44 on the left-hand wing portion 40 and is determined by the spherical surface 54 on the pivot/bushing 48 and the lower spherical surface 38 of mass 30. This prevents a redundance of aligning forces which may oppose one another creating friction.

Rotation about the Y axis in FIG. 1 is desired to correct for slight differences in manufacturing tolerances of the diameters of the cam wheels 64 causing a slight cocking of the axis of the mass 30. Rotational position about the Y axis is determined by the cams 64 pushing down on the front and back of the shaft 68 while the springs 74 push up in the middle causing the balancing mass to align itself to divide the load on the shaft equally between the rollers or wheels 66.

Rotation about the Z axis, on the other hand, is accomodated about the pivot/bushing 48. The pivot/bushing 48 being located at the right upper side of the mass 30 provides stability in this case because the mass attempts to selfalign in the manner of a car pulling a two wheeled trailer. When the crankshaft is reversed in direction, or rotated backwards, the mass 30 tries to misalign itself in the same manner as a trailer when the car is being backed; i.e., it is unstable. However, any misalignment in this case is limited by the small clearance space 44 between the sleeve 34 and the sleeve insert 42 and, therefore, the thrust along the X axis is minimized.

To state the above another way, three spacial axes are shown, with the X axis parallel to the crankshaft axis, the Z axis vertical, and the Y axis horizontal and crosswise to the crankshaft. To cancel the secondary shaking force, the inertial mass has to move up and down along the Z axis only and no other motion is desired. However, to minimize friction, sufficient degrees of freedom are necessary to permit good alignment of the parts with minimum normal force applied at the sliding surfaces.

The desired degrees of freedom for the inertia masses are: (1) translational along the X axis to cancel the engine unbalance forces; (2) rotational about the Z axis to keep the shaft axle 94 parallel to the crankshaft axis, (any skewing would result in a force being produced along the X axis); and (3) rotational about the Y axis to equally distribute the load between the two wheels on opposite ends of the shaft axle 94.

The pivot/bushing combination 48, located high and on one side of the inertial mass 30 prevents translation along the Y and X axes but allows translation along the Z axis and rotation about all three axes. As long as the cam surface travels away from the pivot 48, the angular position about the Z axis is stable, similar to a two-wheeled trailer being towed behind a car. If the crankshaft rotation is reversed and the cam surface travels toward the pivot 48, the angular position about the Z axis becomes unstable similar to a trailer being backed up.

The small clearance 46 of the spacer/bushing combination 44 on the opposite side of the inertial mass 30 from the pivot 48 allows freedom of rotation about the Y axis during the normal forward crankshaft rotation, but limits that degree of freedom during any backwards rotation of the crankshaft.

Of the six possible degrees of freedom, only three are desired, yet the pivot/bushing combination 48 provides four. The remaining undesired degree of freedom is rotation about the X axis.

The spherical surface 38 located on the lower part of the inertial mass 30 is fitted between the two stationary vertical walls 36. This combination constrains only one degree of freedom, translation along the Y axis. Coupling this constraint with the constraints of upper pivot 48 produces a constraint against rotation about the X axis.

Looking at the complete assembly with springs, rollers and cams, the two cam surfaces 64 against the wheels 66 control translation along the Z axis and rotation about the Y axis. Thus, all degrees of freedom are controlled, but not redundantly, which could cause high forces, stress and friction.

Completing the construction, the journal bearing 70 and shaft 68 are lubricated by means of a number of intersecting oil passages 75 in mass 30, 76 in split ring 52, 78 in the spherical bushing portion 56, and 80 in sleeve 34, to flow along the clearance space 82 between bolt or shaft 28 and sleeve 34, a passage 84 in the main lower bearing cap 22, an annular space 86 defined by a reduced section of the attaching bolt 26, and a passage 88 connected to the main journal bearing 12.

The lower assembly is enclosed by an oil baffle or similar cover 100 that has a pair of holes 102 through which the bolts 28 are inserted for holding the cover in place against the lower guide plate 32.

Figure 4:
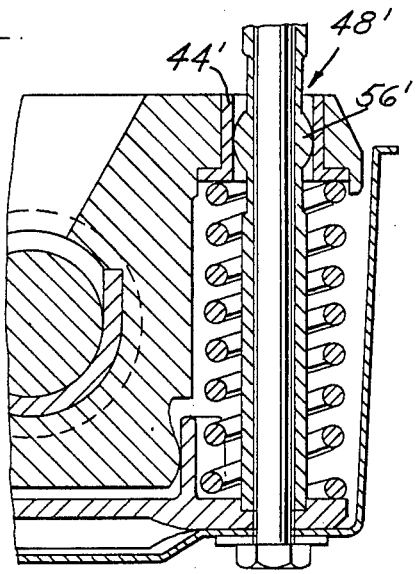
FIG. 4 is a view of a portion of the FIG. 2 showing indicating an alternative construction.

FIG. 4 illustrates a modification in which the spherical pivot/bushing 48' may be formed as an integral part 56' of the stationary sleeve 34, rather than as separate parts as in FIG. 2. A sleeve insert 44' would be secured to the mass 30 as a bearing surface.

While the invention has been shown and described in its preferred embodiments, it will be clear to those skilled in the arts to which the invention pertains, that many changes and modifications may be made thereto without departing from the scope of the invention. For example, the balancing mass could be supported from the lower bearing cap on extensions of the attaching bolts 26, instead of on separate bolts 28.

We claim:

1. A crankshaft vibration balancing means for an automotive type internal combustion engine, comprising, in combination, an engine block having main bearing means, a crankshaft rotatably mounted in the bearing means, and at least one main bearing cap securing the bearing means and crankshaft to the block, a vibration balancing mass suspended from the cap and spaced radially therefrom, means for mounting the mass for a radial oscillatory movement with respect to the axis of the crankshaft, and cam means on the crankshaft engagable with and reciprocating the mass upon rotation of the crankshaft, the means for mounting including means restricting translational movement of the mass to the radial direction only during reciprocation by the cam means while permitting a limited rotational freedom of movement restricted to only sufficient movement to maintain the mass in alignment for movement in the radial direction.

2. A means as in claim 1, including spring means biasing the mass into engagement with the cam means.

3. A means as in claim 2, the means for mounting the mass including a support shaft depending from the cap on either side of the crankshaft, the mass having a pair of holes receiving the shafts therethrough for a sliding movement of the mass on the shafts, the spring means biasing the mass towards the cap, and spherical bushing means in at least one of the holes between and contiguous to the associated shaft and mass permitting a pivotal movement of the mass to compensate for misalignment of the mass from a radial movement during reciprocatory movement by the crankshaft, and means for limiting the pivotal movement in at least one direction.

4. A means as in claim 3, including a clearance space between the other shaft and the wall of the mass defining the other hole permitting a limited pivotal movement of the mass about the bushing in the one direction while restricting the pivotal movement of the mass in the opposite direction.

5. A crankshaft vibration balancing means for an automotive type internal combustion engine, comprising, in combination, an engine block having main bearing means, a crankshaft rotatably mounted in the bearing means, and at least one main bearing cap securing the bearing means and crankshaft to the block, a vibration balancing mass suspended from the cap and spaced radially therefrom, means for mounting the mass for a radial oscillatory movement with respect to the axis of the crankshaft, and cam means on the crankshaft engagable with and reciprocating the mass upon rotation of the crankshaft, the means for mounting including means restricting freedom of movement of the mass to the radial direction only during reciprocation by the cam means while permitting a limited freedom of movement rotatively during reciprocation restricted to only sufficient movement to automatically align the mass for movement in the radial direction.

6. A means as in claim 4, including a stationary sleeve surrounding each shaft and extending through each hole and the bushing, the clearance space being between the sleeve and mass, the mass being slidable vertically on the sleeves.

7. A means as in claim 3, the mass having a central shaft rotatably mounted therein with an axis parallel to the crankshaft axis, and a pair of cam follower wheels fixed thereto at each end and rotatable therewith and engagable with the cam means on the crankshaft, the cam means comprising a pair of contoured cam wheels fixed on cheek portions of the crankshaft on opposite sides of the main bearing means.

8. A means as in claim 7, each of the cam follower wheels being of the same diameter as the other, and each of the contoured cam wheels being of the same diameter as the other, for maintaining the axis of the mass shaft parallel to the axis of the crankshaft to aid in effecting the radial movement of the mass.

9. A means as in claim 3, including a guide plate connecting the lower ends of the shafts providing a rigid frame for sliding support of the mass, the plate having upstanding flat guide means slidably receiving therein the end of the mass furthest from the crankshaft to permit radial/vertical movement of the mass while preventing lateral/horizontal movement of the mass.

10. A means as in claim 9, wherein the furthest end of the mass is spherically formed to permit rotation of the mass about the bushing.

11. A means as in claim 9, the mass having essentially a rectangular shape with wing portions extending laterally/axially therefrom at its radially innermost Portion, the spring means extending between the guide plate and wing portions, the wing portions having the holes therein receiving the shafts therethrough.

12. A means as in claim 7, including a journal bearing fixed in the mass and rotatably supporting the central shaft therein.

13. A crankshaft vibration balancing means for an automotive type internal combustion engine, comprising, in combination, an engine block having main bearing means fixedly secured in the block, a crankshaft rotatably mounted in the bearing means, and at least one main bearing cap securing the bearing means and crankshaft to the block, the crankshaft having a pair of cheek portions contiguous to opposite axial sides of the main bearing means, the balancing means including a vibration balancing mass including a shaft mounted for rotation, cam surface means formed on the circumferential face of each cheek portion, separate cam follower means fixed on the shaft for rotation therewith and engagable one-on-one with each of the cam means to be rotated thereby upon rotation of the crankshaft, and means for mounting the mass beneath and upon the bearing cap for a radial oscillatory movement of the mass with respect to the bearing cap by the pair of cam means forcing a radial movement of the cam follower means to balance an order of vibration of the crankshaft at a selected frequency of rotation thereof.

14. A balancing means as in claim 13, wherein the means for mounting includes sleeve means secured to and projecting from the bearing cap, the mass being slidably mounted on the sleeve means for a longitudinal movement relative thereto permitting the oscillatory movement.

15. A balancing means as in claim 13, wherein the cam follower means comprises a wheel secured to the shaft.

16. A balancing means as in claim 15, the mass being symetrically arranged beneath the bearing cap.

17. A crankshaft vibration balancing means for an automotive type internal combustion engine, comprising, in combination, an engine block having main journal bearings, a crankshaft rotatably mounted in the journal bearings, at least one main bearing cap enclosing the journal bearings and crankshaft, bolt means securing the cap to the block, and further bolt means Projecting outwardly from the bearing cap, a sleeve surrounding each further bolt means, and a vibration balancing mass mounted on the sleeves for an axial sliding movement relative thereto, the crankshaft having cheek portions contiguous to opposite sides of the main bearing cap, a roller type shaft mounted parallel to the crankshaft and rotatable within the mass and having cam follower wheels on opposite ends thereof each engagable with the surface of a cam formed on each of the cheek portions, the contour of the cam forcing the axial sliding oscillation of the mass upon the sleeves in response to rotation of the crankshaft to balance a particular vibration of the crankshaft, and spring means biasing the wheels and mass radially into engagement with the cams.

* * * * *